(12) United States Patent
Chen et al.

(10) Patent No.: US 9,569,229 B1
(45) Date of Patent: Feb. 14, 2017

(54) AUTOMATIC START OF AN APPLICATION AT START UP FOR A MEDIA PLAYER APPLIANCE

(71) Applicant: Western Digital Technologies, Inc., Irvine, CA (US)

(72) Inventors: Jeffrey Yen-Liang Chen, Irvine, CA (US); Scott A. Rader, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 259 days.

(21) Appl. No.: 14/028,295

(22) Filed: Sep. 16, 2013

Related U.S. Application Data

(60) Provisional application No. 61/859,747, filed on Jul. 29, 2013.

(51) Int. Cl.

| | |
|---|---|
| *G06F 9/46* | (2006.01) |
| *G06F 9/00* | (2006.01) |
| *G06F 9/24* | (2006.01) |
| *G06F 15/177* | (2006.01) |
| *G06F 3/00* | (2006.01) |
| *G06F 3/048* | (2013.01) |
| *G06F 9/44* | (2006.01) |
| *G06F 9/48* | (2006.01) |
| *G06F 3/0484* | (2013.01) |
| *G06F 3/0481* | (2013.01) |

(52) U.S. Cl.
CPC ............ *G06F 9/4421* (2013.01); *G06F 3/048* (2013.01); *G06F 3/0481* (2013.01); *G06F 3/0484* (2013.01); *G06F 9/44* (2013.01); *G06F 9/4401* (2013.01); *G06F 9/48* (2013.01); *G06F 9/4843* (2013.01)

(58) Field of Classification Search
None
See application file for complete search history.

(56) References Cited

U.S. PATENT DOCUMENTS

| | | | |
|---|---|---|---|
| 6,675,300 B1 * | 1/2004 | Jung | G06F 21/305 700/17 |
| 7,005,966 B1 * | 2/2006 | Leman | G08C 17/02 340/10.1 |
| 7,409,569 B2 | 8/2008 | Illowsky et al. | |
| 7,454,542 B2 | 11/2008 | Illowsky et al. | |
| 7,571,346 B2 | 8/2009 | Illowsky et al. | |
| 7,596,227 B2 | 9/2009 | Illowsky et al. | |
| 7,600,252 B2 | 10/2009 | Illowsky et al. | |
| 7,613,881 B2 | 11/2009 | Illowsky et al. | |
| 7,703,073 B2 | 4/2010 | Illowsky et al. | |
| 7,712,111 B2 | 5/2010 | Illowsky et al. | |
| 7,730,482 B2 | 6/2010 | Illowsky et al. | |

(Continued)

OTHER PUBLICATIONS

Faaborg, "User Experience Design at Mozilla", May 11, 2009, pp. 1-7, https://blog.mozilla.org/faaborg/2009/05/11/critical-warning/.*

*Primary Examiner* — Charles Swift

(57) ABSTRACT

A media player appliance including a controller configured to receive an indication from a remote control device that designates a selected application to automatically start when the media player appliance is starting up, update a configuration file to designate the selected application for automatic start, and automatically start an application designated in the configuration file when the media player appliance is starting up.

26 Claims, 12 Drawing Sheets

(56) References Cited

U.S. PATENT DOCUMENTS

| | | |
|---|---|---|
| 7,747,980 B2 | 6/2010 | Illowsky et al. |
| 7,761,863 B2 | 7/2010 | Illowsky et al. |
| 7,788,663 B2 | 8/2010 | Illowsky et al. |
| 7,831,752 B2 | 11/2010 | Illowsky et al. |
| 8,327,286 B2 * | 12/2012 | Deutsch ................ G06F 9/4443 715/778 |
| 8,516,383 B2 * | 8/2013 | Bryant ................ G06F 3/0481 715/762 |
| 2003/0140120 A1 | 7/2003 | Hartman |
| 2004/0260956 A1 * | 12/2004 | Pagan ............................ 713/300 |
| 2005/0026700 A1 * | 2/2005 | Blanco ............................ 463/43 |
| 2005/0251806 A1 * | 11/2005 | Auslander et al. ........... 718/100 |
| 2005/0289264 A1 | 12/2005 | Illowsky et al. |
| 2005/0289265 A1 | 12/2005 | Illowsky et al. |
| 2005/0289266 A1 | 12/2005 | Illowsky et al. |
| 2005/0289383 A1 | 12/2005 | Illowsky et al. |
| 2005/0289508 A1 | 12/2005 | Illowsky et al. |
| 2005/0289509 A1 | 12/2005 | Illowsky et al. |
| 2005/0289510 A1 | 12/2005 | Illowsky et al. |
| 2005/0289527 A1 | 12/2005 | Illowsky et al. |
| 2005/0289531 A1 | 12/2005 | Illowsky et al. |
| 2005/0289558 A1 | 12/2005 | Illowsky et al. |
| 2005/0289559 A1 | 12/2005 | Illowsky et al. |
| 2006/0005193 A1 | 1/2006 | Illowsky et al. |
| 2006/0005205 A1 | 1/2006 | Illowsky et al. |
| 2006/0010453 A1 | 1/2006 | Illowsky et al. |
| 2006/0015665 A1 | 1/2006 | Illowsky et al. |
| 2006/0015936 A1 | 1/2006 | Illowsky et al. |
| 2006/0015937 A1 | 1/2006 | Illowsky et al. |
| 2006/0020912 A1 | 1/2006 | Illowsky et al. |
| 2006/0026305 A1 | 2/2006 | Illowsky et al. |
| 2006/0026588 A1 | 2/2006 | Illowsky et al. |
| 2006/0149955 A1 * | 7/2006 | Velhal et al. .................... 713/1 |
| 2006/0206882 A1 | 9/2006 | Illowsky et al. |
| 2007/0143768 A1 * | 6/2007 | Inami et al. ................... 718/104 |
| 2007/0186188 A1 * | 8/2007 | Harris ................ G06F 9/44521 715/835 |
| 2008/0113789 A1 * | 5/2008 | Canessa et al. ................. 463/29 |
| 2008/0171600 A1 * | 7/2008 | Ostergren ............... A63F 13/12 463/42 |
| 2009/0031037 A1 | 1/2009 | Mendell et al. |
| 2009/0063837 A1 * | 3/2009 | Shayer et al. .................... 713/2 |
| 2009/0113088 A1 | 4/2009 | Illowsky et al. |
| 2009/0178126 A1 | 7/2009 | Du et al. |
| 2009/0276618 A1 * | 11/2009 | Madjlessi ........................ 713/2 |
| 2010/0157989 A1 | 6/2010 | Krzyzanowski et al. |
| 2010/0157990 A1 | 6/2010 | Krzyzanowski et al. |
| 2010/0159898 A1 | 6/2010 | Krzyzanowski et al. |
| 2010/0205559 A1 * | 8/2010 | Rose .................... G06F 3/0482 715/781 |
| 2010/0293365 A1 * | 11/2010 | Tandon ............................. 713/2 |
| 2011/0004749 A1 * | 1/2011 | Bennetts et al. .............. 713/100 |
| 2011/0047288 A1 * | 2/2011 | Sakano ........................ 709/236 |
| 2011/0105182 A1 | 5/2011 | Sant et al. |
| 2011/0302531 A1 * | 12/2011 | Takushima .................... 715/811 |
| 2011/0305435 A1 | 12/2011 | Tanaka et al. |
| 2012/0032945 A1 | 2/2012 | Dare et al. |
| 2012/0036220 A1 | 2/2012 | Dare et al. |
| 2012/0036245 A1 | 2/2012 | Dare et al. |
| 2012/0036440 A1 | 2/2012 | Dare et al. |
| 2012/0036442 A1 | 2/2012 | Dare et al. |
| 2012/0036552 A1 | 2/2012 | Dare et al. |
| 2012/0137282 A1 | 5/2012 | Illowsky et al. |
| 2012/0284673 A1 * | 11/2012 | Lamb ................ G06F 3/04883 715/863 |
| 2013/0311762 A1 * | 11/2013 | Bank .................... G06F 9/4401 713/2 |
| 2014/0215248 A1 * | 7/2014 | Cheng et al. ................. 713/323 |

* cited by examiner

AUTOMATIC START OF AN APPLICATION AT START UP FOR A MEDIA PLAYER APPLIANCE

CROSS-REFERENCE TO RELATED APPLICATIONS

This application claims the benefit of U.S. Provisional Application No. 61/859,747, filed on Jul. 29, 2013, entitled "AUTO RUN OF APPLICATIONS AT START UP FOR MEDIA PLAYER," which is hereby incorporated by reference in its entirety.

BACKGROUND

In a conventional media player appliance, various applications are displayed on a display screen. Given the boom in digital video, music, and other content a large number of applications may be displayed. However, the user may only use a limited number of applications most of the time. This may be problematic if there are a large number of applications. In such a case, the user may be unable to easily locate and start a desired application.

BRIEF DESCRIPTION OF THE DRAWINGS

The features and advantages of the present embodiments will become more apparent from the detailed description set forth below when taken in conjunction with the drawings, wherein.

DETAILED DESCRIPTION

In an embodiment, a media player appliance 102 comprises, for example, a streaming media player, a cable box, a network access storage ("NAS") device, a direct access storage ("DAS") device, or other electronic device which may store and run an application. The media player appliance 102 can be connected, for example, to a display unit 104 such as a television, a monitor, or other device which may display the application run by the media player appliance 102. Furthermore, the application may be stored locally in the media player appliance 102, or remotely, on a remote storage site. In an embodiment, the media player appliance may run the application from the remote storage site. In an embodiment, when the media player appliance 102 comprises the streaming media player, the streaming media player is configured to stream media from an external source and to display the streamed media on the display unit 104. In an embodiment, the media player appliance 102 is configured to be an application specific media player appliance 102. For example, the media player appliance 102 can be configured to automatically start an application during startup of the media player appliance 102. In an embodiment, the media player appliance 102 may also utilize other applications in addition to the application which is automatically started when the media player appliance 102 starts up.

In an embodiment, the media player appliance 102 can receive inputs from the remote control device 110. Furthermore, in an embodiment, the remote control device 110 may be wirelessly connected to the media player appliance 102. However, in an embodiment, the remote control device 110 may also be connected to the media player appliance 102 through a cable. In an embodiment, the media player appliance 102 comprises the remote control device 110.

In an embodiment, the remote control device 110 comprises a limited-input control device. For example, the remote control device 110 may not comprise a separate button for each of the letters of the alphabet and may require for example one or more depressions of a button within a predetermined period of time to provide an input for a letter of the alphabet. In an embodiment, the limited-input control device lacks a QWERTY keyboard. In an embodiment, the remote control device 110 comprises a mobile device comprising an application installed on the mobile device, which allows the mobile device to provide inputs to the media player appliance 102.

Figure 2:
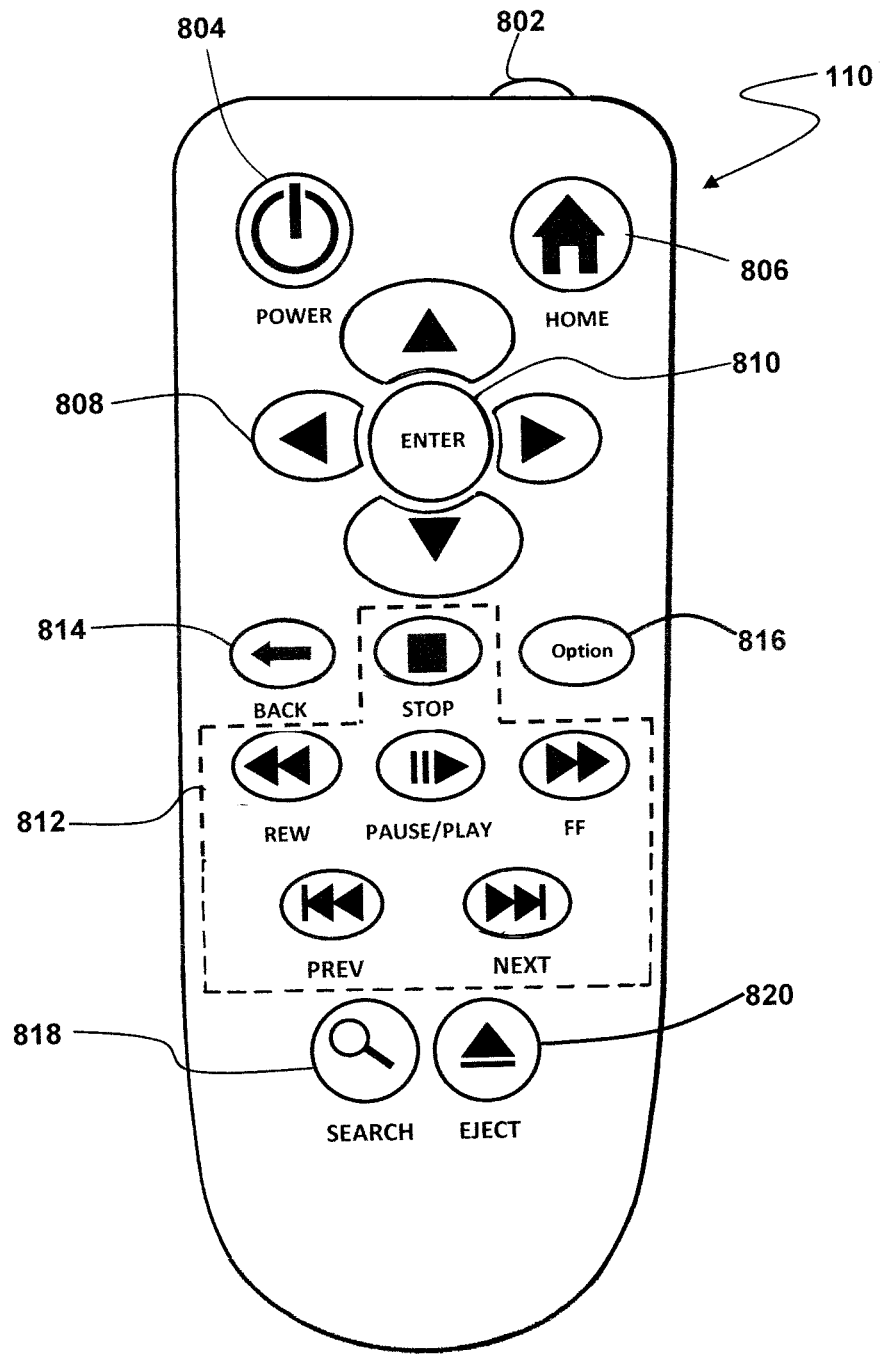
FIG. 2 depicts a remote control device according to an embodiment.
Figure 3:
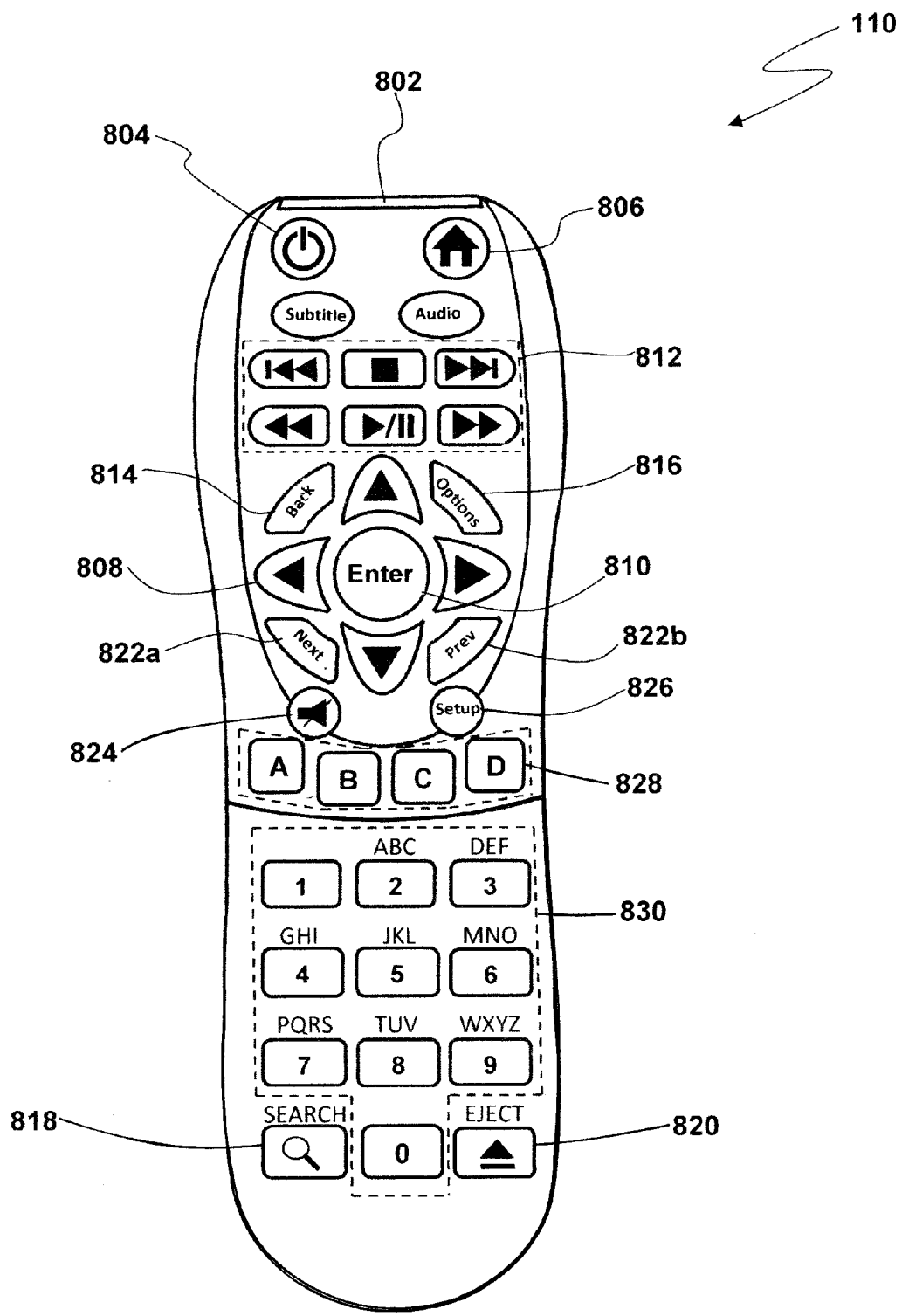
FIG. 3 depicts a remote control device according to an embodiment.

In some embodiments, the remote control device 110 is shown in FIGS. 2 and 3. In the embodiment shown in FIG. 2, the remote control device 110 comprises a transmitter 802, a power button 804, a home button 806, navigation buttons 808, an enter button 810, media buttons 812, a back button 814, an option button 816, a search button 818, and an eject button 820.

In an embodiment, the transmitter 802 is configured to transmit signals from the remote control device 110 to the media player appliance 102. In an embodiment, the transmitter 802 comprises an infrared transmitter. In an embodiment, the power button 804 is configured to indicate to the media player appliance 102 to start up or shut down. In an embodiment, the home button 806 is configured to indicate to the media player appliance 102 that a home screen in a user interface should be displayed on the display unit 104. In an embodiment, the navigation buttons 808 is configured to indicate to the media player appliance 102 how to navigate through various items or options presented by the media player appliance 102. In an embodiment, the enter button 810 is configured to indicate to the media player appliance 102 that an item or option is selected.

In an embodiment, the media buttons 812 are configured to indicated to the media player appliance 102 how to play a media. In an embodiment, the back button 814 is configured to indicate to the media player appliance 102 that the media player appliance 102 should go back to a previous option or screen. In an embodiment, the option button 816 is configured to indicate to the media player appliance 102 that available options should be displayed on the display unit 104. In an embodiment, the search button 818 is configured to indicate to the media player appliance 102 that a search mode should be displayed on the display unit 104. In an embodiment, the eject button 820 is configured to indicate to the media player appliance 102 that the media player appliance 102 should be configured for safe removal of an attached storage device.

In an embodiment shown in FIG. 3, the remote control device 110 contains additional buttons in addition to the remote control device 110 shown in FIG. 2. In the embodiment shown in FIG. 3, the remote control device 110 also comprises a next page button 822a, a previous page button 822b, a mute button 824, a setup button 826, assignable buttons 828, and number buttons 830.

In an embodiment, the next page button 822a is configured to indicate to the media player appliance 102 that a next page should be displayed. In an embodiment, the previous page button 822b is configured to indicate to the media player appliance 102 that a previous page should be displayed. In an embodiment, the mute button 824 is configured to indicate to the media player appliance 102 to switch between muting and unmuting the sounds. In an embodiment, the setup button 826 is configured to indicate to the media player appliance 102 that a setup screen should be displayed.

In an embodiment, the assignable buttons 828 are configured to be assigned by the user to indicate to the media player appliance 102 that a function should be utilized or an application should be started. In an embodiment, the number buttons 830 are configured to indicate to the media player appliance 102 numerical values. However, in an embodiment, the number buttons 830 are also configured to indicate to the media player alphanumerical values. In an embodiment, the number buttons 830 may indicate to the media player 102 alphabetical values by depressing the number buttons 830 one or more times to achieve a desired alphabetical value.

Figure 1:
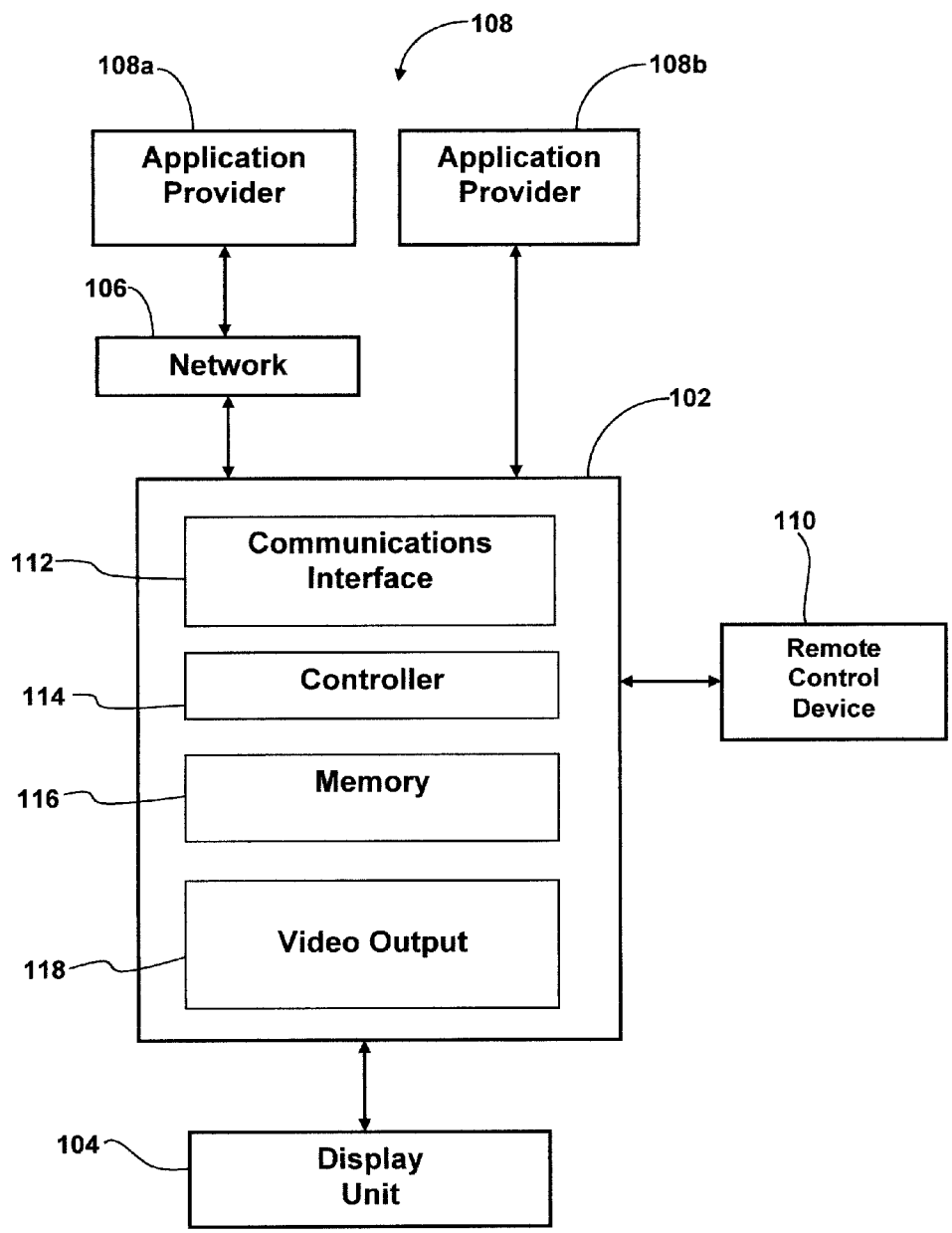
FIG. 1 depicts a media player appliance, a remote control device, a display unit, and a plurality of application providers according to an embodiment.

Referring back to FIG. 1, in an embodiment, the media player appliance 102 comprises a communications interface 112, a controller 114, memory 116, and a video output 118. In an embodiment, the communications interface 112 is configured to communicate with the application provider 108 directly or through another device. For example, the communications interface 112 can communicate with the application provider 108b directly, such as when the application provider 108b is plugged into the media player appliance 102.

In addition, the communications interface 112 can communicate with the application provider 108a indirectly, such as when the application provider 108a is connected to a network 106. The network 106 can comprise, for example, a local area network ("LAN"), a wide area network ("WAN"), wireless networks, cellular networks, the Internet, a cable network, or other types of networks which can provide access to the application providers 108. In such a case, the communications interface 112 can connect to the network 106 to communicate with the application provider 108a.

In an embodiment, the communications interface 112 allows for the media player appliance 102 to access the one or more application providers 108. In an embodiment, the communications interface 112 is also configured to receive input from the remote control device 110. In an embodiment, the communications interface 112 comprises a network interface controller, Wi-Fi interface, a universal serial bus ("USB") port, a coaxial cable port, or other ports which may allow the media player appliance 102 to access the one or more application providers 108. In an embodiment, the communications interface 112 also allows the media player appliance 102 to access one or more content providers which can provide content for the media player appliance.

In an embodiment, the video output 118 is configured to connect to the display unit 104 and provide images or video to the display unit 104 so that the video or images can be displayed on the display unit 104. In an embodiment, the display unit 104 comprises a television, a monitor, or other device which may display the applications stored and run by the media player appliance 102. In an embodiment, the display unit 104 may also display content stored and played by the media player appliance 102.

In an embodiment, the memory 116 comprises at least one of a solid state memory or a magnetic rotating disk. Furthermore, the memory 116 comprises a volatile or a non-volatile memory. In an embodiment, the memory 116 is configured to store data on the media player appliance 102.

While the description herein refers to solid state memory generally, it is understood that solid state memory may comprise one or more of various types of solid state non-volatile memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

Figure 4:
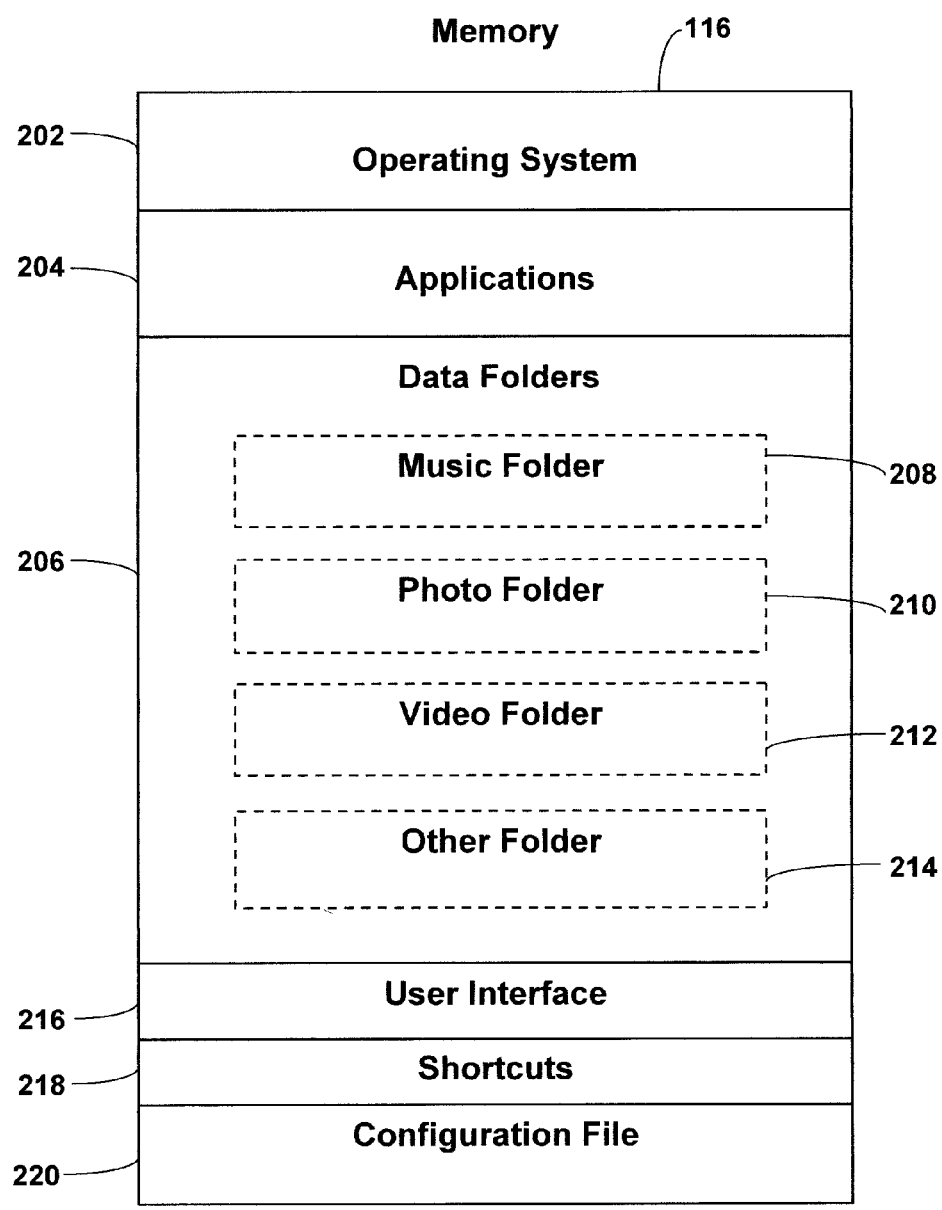
FIG. 4 depicts contents of memory in a media player appliance according to an embodiment.

In the embodiment shown in FIG. 4, some of the data stored in the memory 116 are shown. For example, the memory 116 can store an operating system 202, applications 204, data folders 206, a user interface definition 216, and shortcuts 218. In an embodiment, the operating system 202 comprises procedures for handling various basic system services and for performing hardware dependent tasks. In an embodiment, the applications 204 can be executed by a processor in the media player appliance 102 to cause the media player appliance 102 to perform certain operations. In an embodiment, the applications 204 comprise, for example, applications for media playing, TV channels, websites, games, e-mail, widgets, and/or search widgets.

In the embodiment shown in FIG. 4, the data folders 206 comprise a music folder 208, a photo folder 210, a video folder 212, and other folders 214. The music folder 208 comprises, for example, content such as music files. The photo folder 210 comprises, for example, content such as photo files. The video folder 212 comprises, for example, content such as video files. The other folders 214 comprises, for example, other content which may be displayed on the display unit 104, such as e-mail files, word processing documents, text files, or other types of files.

Figure 5:
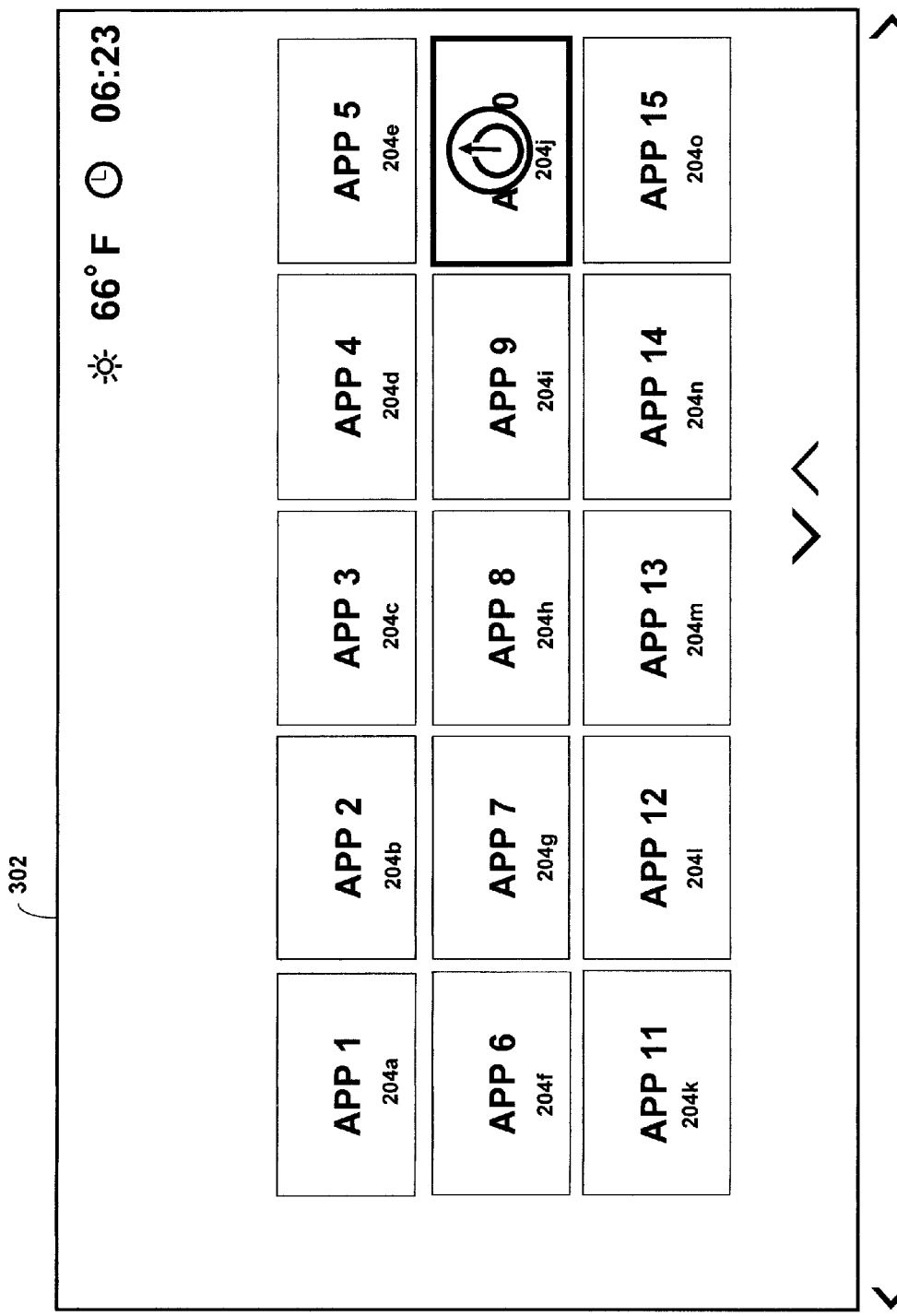
FIG. 5 depicts a user screen interface according to an embodiment.

In an embodiment, the memory 116 also stores a user interface definition 216. The user interface definition 216 comprises information for displaying a user interface 302 as shown in the embodiment in FIG. 5. In the user interface 302, shortcuts 204a-204o for Applications 1-15 are shown. In addition, the user interface 302 can display additional menus such as the menu 304 shown in an embodiment in FIG. 6. In an embodiment, the user interface definition 216 can also comprise information regarding a home screen, when the home screen is displayed as the user interface.

In an embodiment, the memory optionally stores shortcut definitions 218. The shortcut definitions 218 correspond to shortcuts which may be displayed on the user interface 302. In an embodiment, the shortcuts correspond to applications or content. When a shortcut is clicked on by a user, such as through the remote control device 110, the media player appliance 102 can start the application or play the content corresponding to the shortcut.

Figure 6:
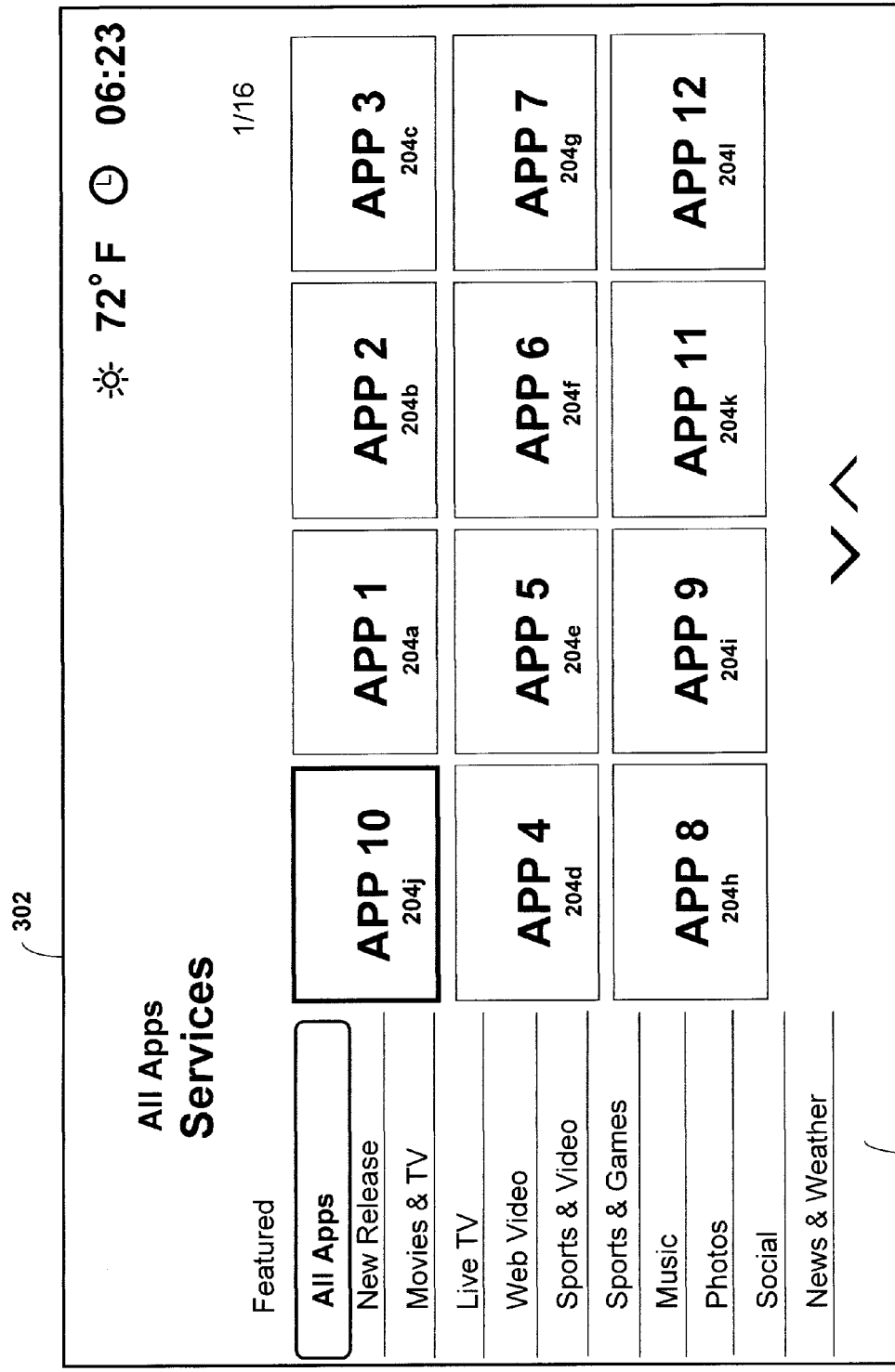
FIG. 6 depicts a user screen interface according to an embodiment.

For example, to select an application to start, a user can move around a cursor in the user interface 302 by utilizing for example, the navigation buttons 808 (FIGS. 2 and 3) in the remote control device 110. The cursor can indicate which application will be started if the user indicates that an application should be started. In an embodiment, the cursor comprises a bolded rectangle and is on the shortcut 204j for the Application 10 as shown in FIG. 6. In an embodiment, the user can indicate that the Application 10 should be started by activating the enter button 810 (FIGS. 2 and 3) in the remote control device 110 while the cursor is over the shortcut 204j for the Application 10.

In an embodiment, the memory 116 can also store a configuration file 220. In an embodiment, the configuration file 220 need not be stored in the memory 116, but instead, can be stored remotely such as on a server or other memory location which is accessible by the controller 114. In an embodiment, the configuration file 220 designates which application should be automatically started when the media player appliance 102 is starting up. In an embodiment, the configuration file comprises a startup file which can be automatically loaded when the media player appliance 102 starts up. In an embodiment the startup file comprises a database, script, or any combination thereof.

Figure 7:
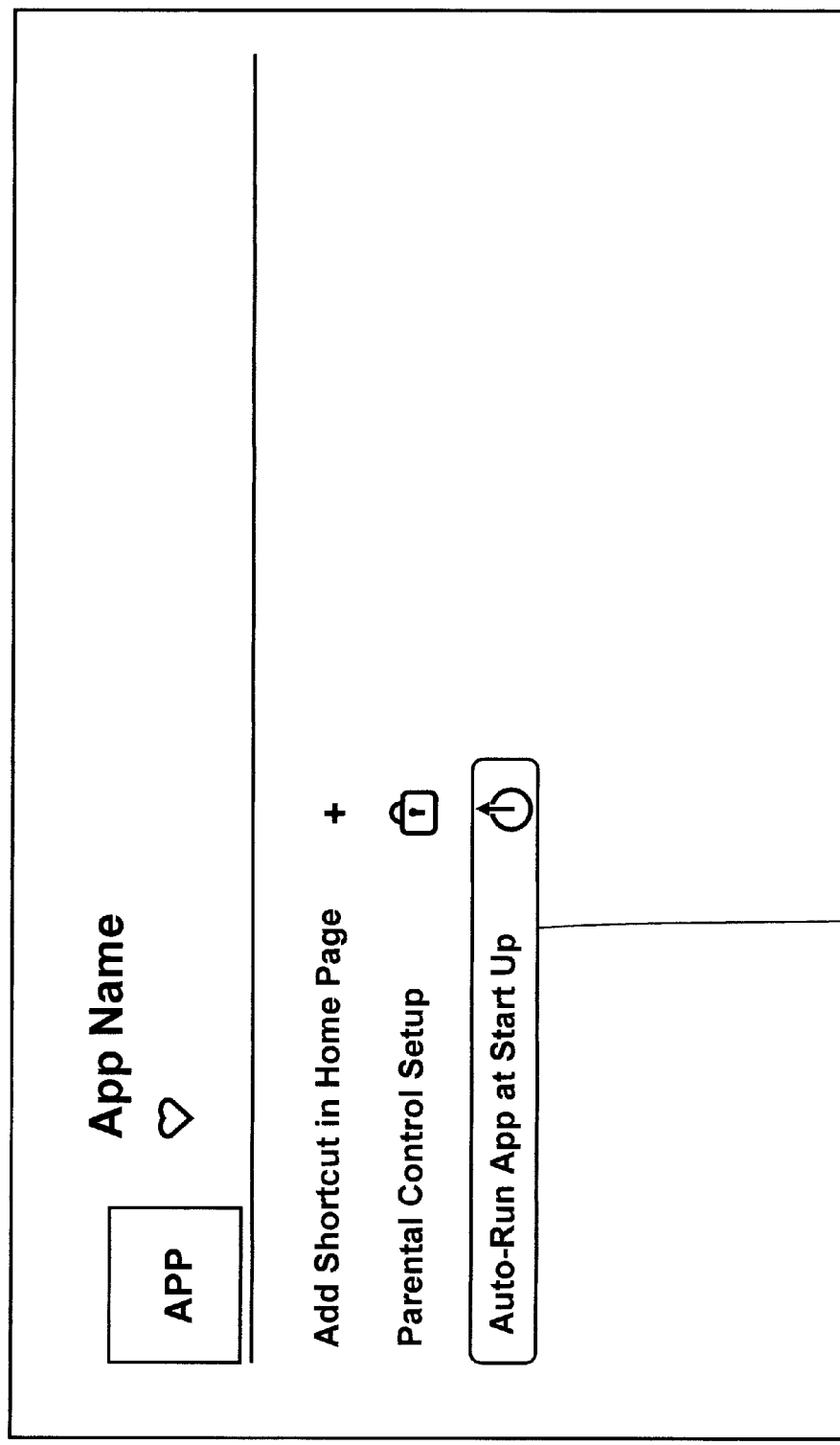
FIG. 7 depicts a user screen interface comprising an option according to an embodiment.

In an embodiment, to designate the application to automatically start, a user can activate a button such as the option button 816 (FIGS. 2 and 3) in the remote control device 110. The controller 114 can receive the indication from the remote control device 110 that options should be displayed on the display unit 104. In an embodiment, the options comprise, for example, a selection interface as shown in FIG. 7. In an embodiment, the selection interface includes an option 306 entitled "Auto-Run App at Start Up". In an embodiment the user can selection the option 306, such as through the navigation buttons 808 and the enter button 810 in the remote control device 110 (FIGS. 2 and 3). When the user selects the option 306, the remote control device 110 indicates to the controller 114 that the selected application is designated to automatically start when the media player appliance 102 is starting up. In an embodiment, the indication can be transmitted through the transmitter 802 (FIGS. 2 and 3) in the remote control device 110.

Figure 8:
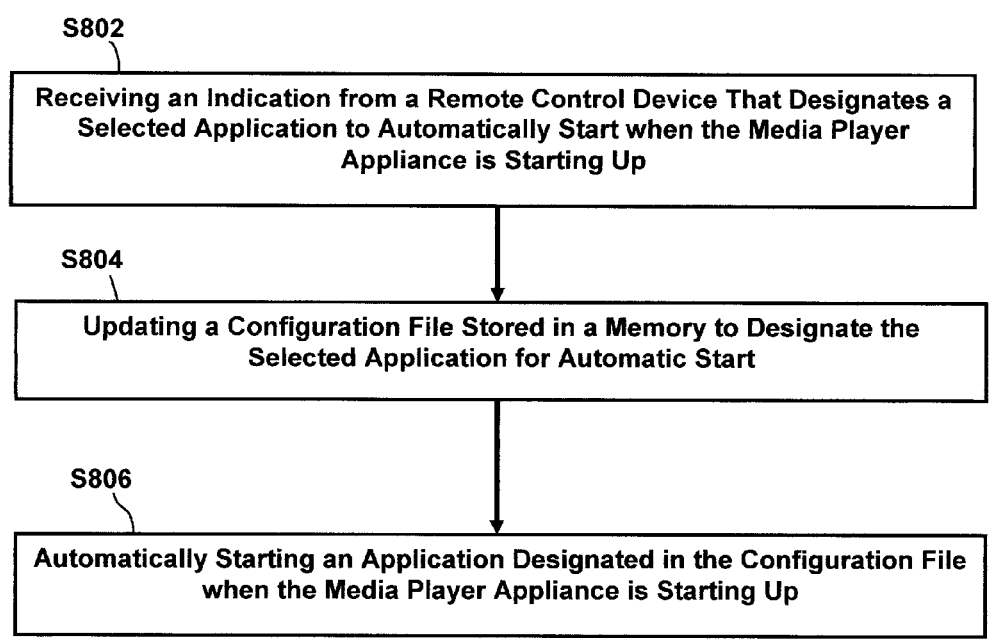
FIG. 8 depicts a process for automatically starting an application according to an embodiment.
Figure 9:
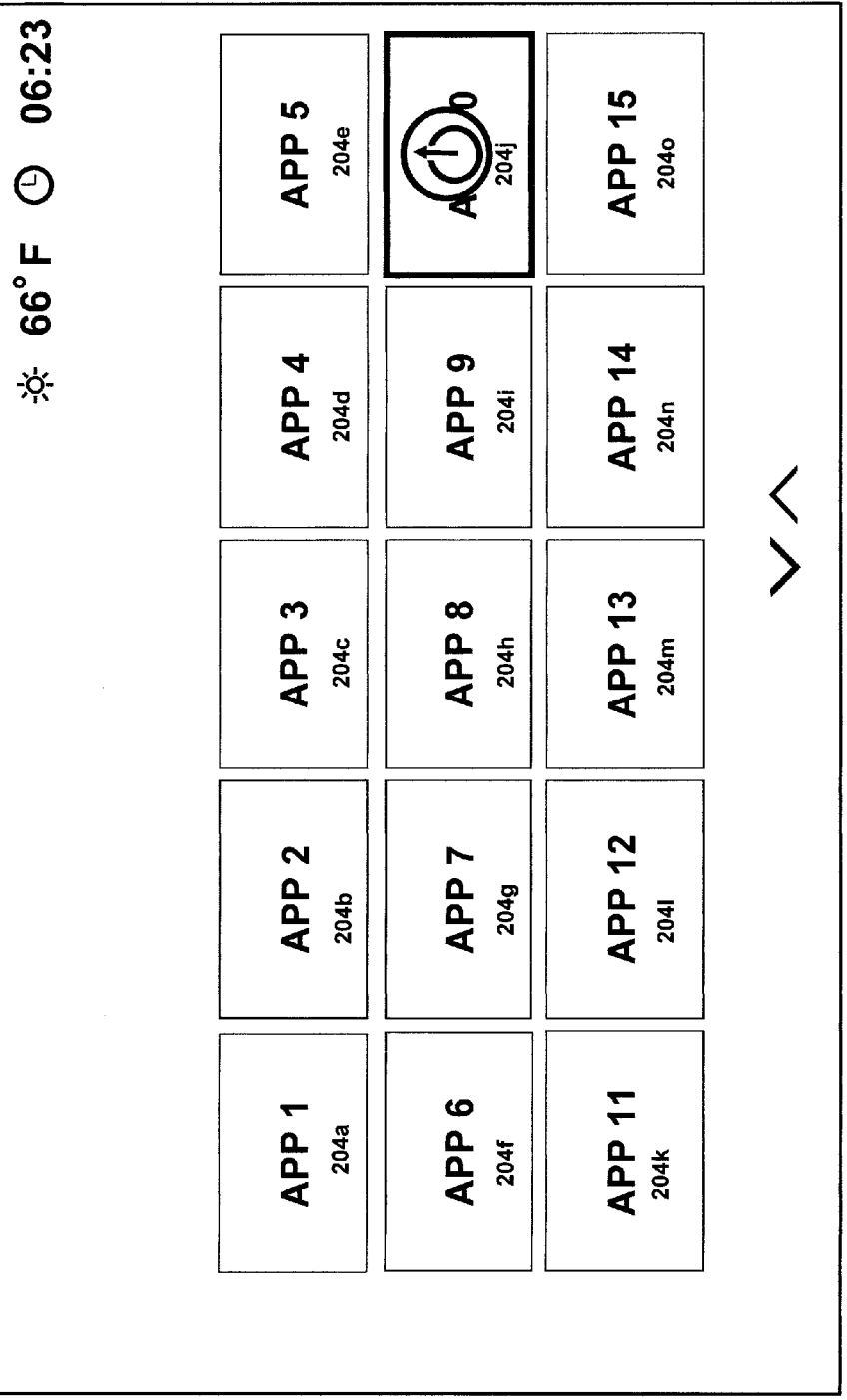
FIG. 9 depicts a user screen interface according to an embodiment.

In an embodiment, an application can be automatically started based on a process shown in FIG. 8. In block S802, the controller 114 receives the indication from the remote control device 110 that designates the selected application to automatically start when the media player appliance 102 is starting up. In block S804, the controller 114 updates the configuration file 220 (FIG. 4) stored in a memory accessible by the controller 114 to designate the selected application for automatic start when the media player appliance is starting up. In an embodiment, the controller 114 can then provide a confirmation to the user on the display unit 104 as shown in an embodiment in FIG. 9.

In an embodiment, the confirmation can include a graphical indication on an application icon that the selected application is set to auto run in the configuration file. In the embodiment shown in FIG. 9, the application icon is framed and also has a start up icon overlaid on top of the application icon. However, other graphical indications may be used to indicate to the user that the application is set to automatically start in the configuration file. Furthermore, the controller can provide a reminder to the user to reboot the media player appliance. In block 5806, the controller 114 automatically starts the application designated in the configuration file 220 when the media player appliance 102 starts up.

Figure 10:
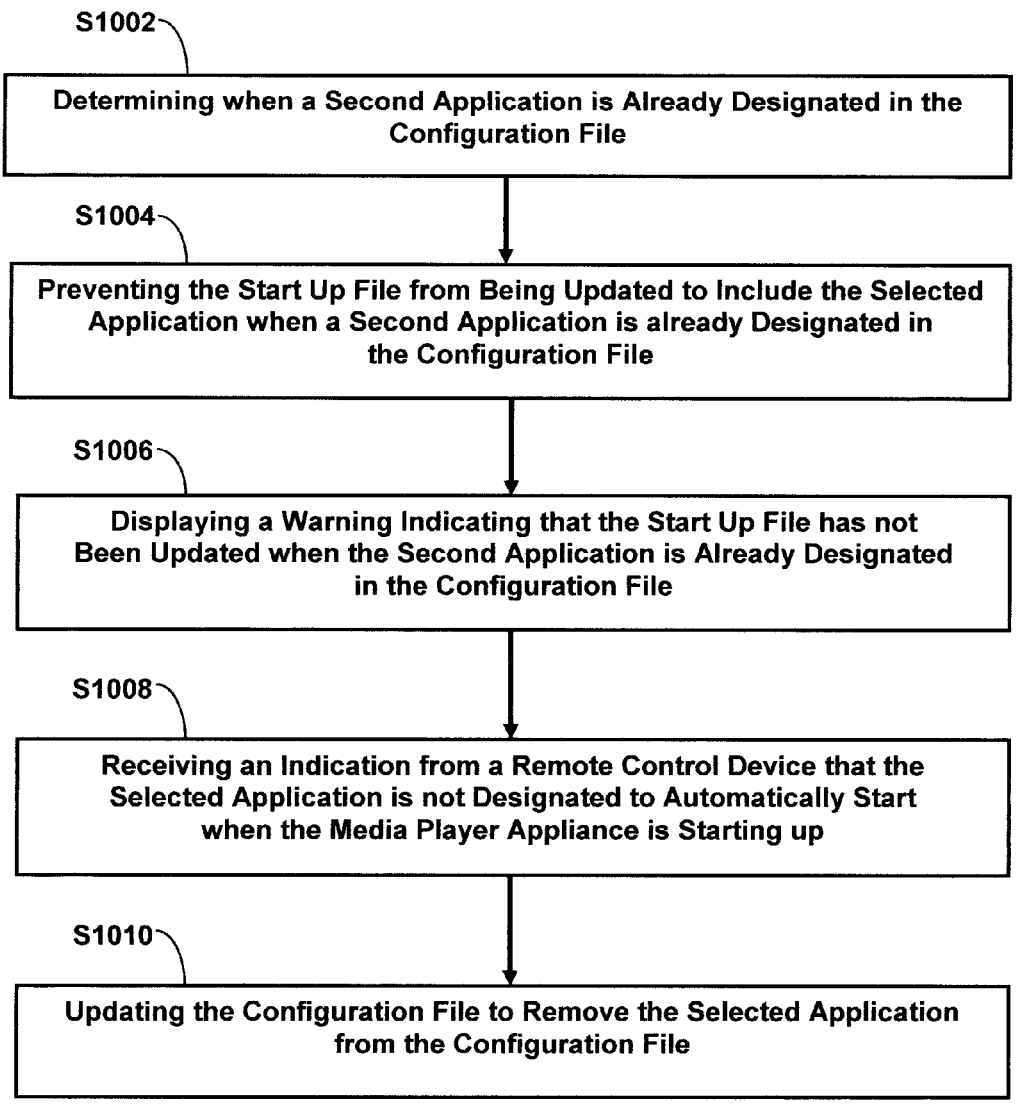
FIG. 10 depicts a process for limiting an automatic start of an application according to an embodiment.

Optionally, the controller 114 can also perform a process shown in FIG. 10 to limit an automatic start of an application. In block S1002, the controller 114 receives the indication from the remote control device 110 that designates the selected application to automatically start when the media player appliance 102 is starting up, the controller 114 determines when a second application is already designated in the configuration file 220. In block S1004, the controller 114 prevents the configuration file 220 from being updated to include the selected application when a second application is already designated in the configuration file 220. Optionally, in block S1006, the controller 114 displays a warning indicating that the configuration file 220 has not been updated when the second application is already designated in the configuration file 220. In an embodiment, the user can override the prevention of updating of the configuration file 220, and replace the second application with the selected application in the configuration file 220, by utilizing the remote control device 110. For example, the controller 114 may display an option for the user to replace the second application with the selected application in the configuration file 220. The user can then confirm that the configuration file 220 should be updated to replace the second application with the selected application by utilizing the remote control device 110.

Figure 11:
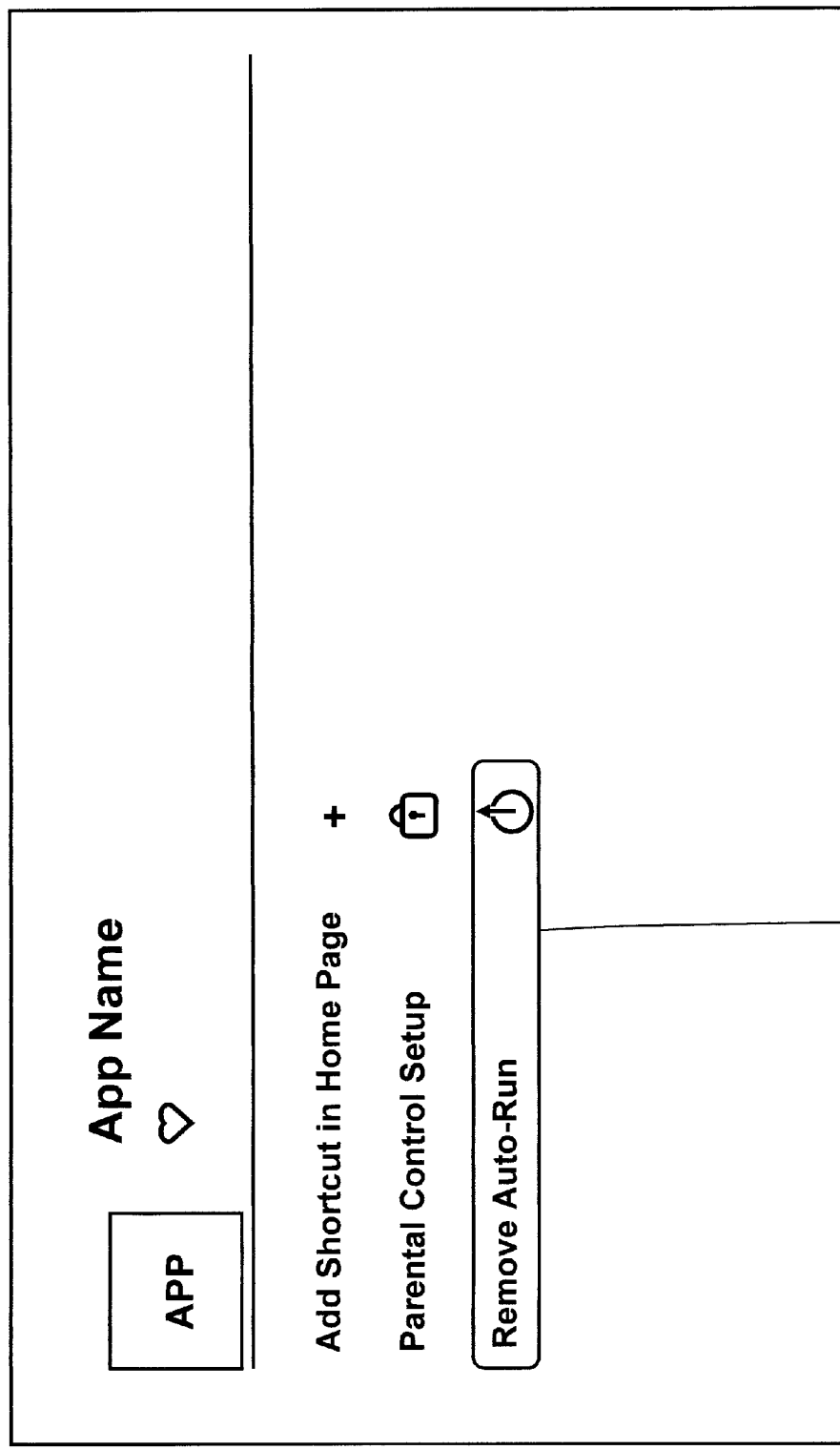
FIG. 11 depicts a user screen interface comprising an option according to an embodiment.

In block S1008, the controller 114 receives an indication from the remote control device 110 that the selected application is not designated to automatically start when the media player appliance 102 is starting up. For example, to designate the application to not automatically start, a user can activate a button such as the option button 816 (FIGS. 2 and 3) in the remote control device 110. The controller 114 can receive the indication from the remote control device 110 that options should be displayed on the display unit 104. In an embodiment, the options comprise, for example, a selection interface as shown in FIG. 11, which is similar to the selection interface shown in FIG. 7. In an embodiment, the selection interface includes an option 308 entitled "Remove Auto_Run" instead of the option 306.

In an embodiment the user can select the option 308, such as through the navigation buttons 808 and the enter button 810 in the remote control device 110 (FIGS. 2 and 3). When the user selects the option 308, the remote control device 110 indicates to the controller 114 that the selected application is not designated to automatically start when the media player appliance 102 is starting up. In an embodiment, the indication can be transmitted through the transmitter 802 (FIGS. 2 and 3) in the remote control device 110.

In block S1010, the controller 114 updates the configuration file 220 to remove the selected application from the configuration file 220.

Figure 12:
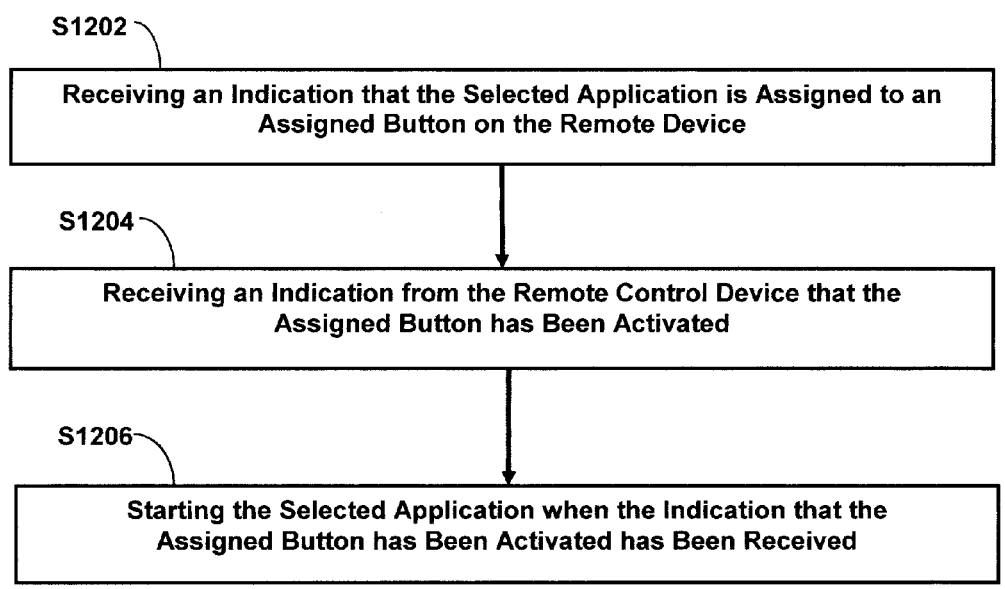
FIG. 12 depicts a process for automatically starting an application according to an embodiment.

In an embodiment, an application can be started based on a process disclosed in FIG. 12. In block S1202, the controller 114 receives an indication that a selected application is assigned to an assigned button on the remote control device 110. For example, as shown in FIG. 3, a button from the assignable buttons 828 may be assigned to the selected application. In block S1204, the controller 114 receives an indication from the remote control device 110 that the assigned button has been activated. In block S1206, the controller 114 starts the selected application when the indication that the assigned button has been activated is received. In an embodiment, this can reduce an amount of time it takes for the user to run an application.

In an embodiment, the configuration file 220 corresponds to user account information for a user account. Thus, different user accounts may have different configuration files 220. The user accounts may comprise a variety of user account information such as the identity of the user account, authentication information, or other types of information. Therefore, when the media player appliance 102 is started, it may request that the user log into the media player appliance 102 with user account information. In an embodiment, logging into the media player appliance with the user account information may require that the user authenticate the user account through a username, password, biometrics, other means of identification, or any combination thereof. In an embodiment, the biometrics comprises fingerprint information, facial recognition information, retina information, or other types of biological information.

In an embodiment, when the user has logged into the media player appliance 102 with the user account information, the controller can retrieve the configuration file 220 corresponding to the user account information and automatically start the application designated in the configuration file 220 which corresponds to the user account information. In an embodiment, user account information may be stored in the memory 116 in the media player appliance 102 or in a remote memory that is accessible by the media player appliance 102.

In an embodiment, the user account information may also comprise information for a user interface configuration. In an embodiment, the user interface configuration may be part of the user interface definition 216 (FIG. 4). Thus, when the user logs in with a particular user account information, the user interface configuration may indicate the configuration of the user interface 302. For example, when the user logs in with a first user account information, a first user interface configuration corresponding to the first user account information may be utilized by the controller 114 to determine the configuration of the user interface. However, when the user logs in with a second user account information, a second user interface configuration corresponding to the second user account information may be utilized by the controller 114 to determine the configuration of the user interface. In an embodiment, the user interface configuration can be altered and saved. In an embodiment, the user interface configuration may be stored in the memory 116 in the media player appliance 102 or in a remote memory that is accessible by the media player appliance 102.

For example, the user interface configuration may indicate the order in which applications are displayed. Thus, more popular or desirable applications may be displayed before less popular or less desirable applications. In an embodiment, the user interface configuration may indicate that certain applications should always be displayed on a first page of the user interface 302. For example, certain applications may be pinned to the first page of the user interface 302.

Those of ordinary skill would appreciate that the various illustrative logical blocks, modules, and algorithm parts described in connection with the examples disclosed herein may be implemented as electronic hardware, computer software, or combinations of both. Furthermore, the embodiments can also be embodied on a non-transitory machine readable medium causing a processor or computer to perform or execute certain functions.

To clearly illustrate this interchangeability of hardware and software, various illustrative components, blocks, modules, circuits, and process parts have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The parts of a method or algorithm described in connection with the examples disclosed herein may be embodied directly in hardware, in a software module executed by a processor, or in a combination of the two. The parts of the method or algorithm may also be performed in an alternate order from those provided in the examples. A software module may reside in RAM memory, flash memory, ROM memory, EPROM memory, EEPROM memory, registers, hard disk, a removable disk, an optical disk, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the disclosure is, therefore, indicated by the appended claims rather than by the foregoing description. All changes which come within the meaning and range of equivalency of the claims are to be embraced within their scope.

What is claimed is:

1. A media player appliance, comprising:
a controller configured to:
receive an indication from a remote control device that designates a selected application to automatically start when the media player appliance is starting up;
update a configuration file of a plurality of configuration files to designate the selected application for automatic start, wherein the configuration file is associated with a first user of a plurality of users of the media player appliance and wherein each configuration file of the plurality of configuration files is associated with a user of the plurality of users;
cause an icon to be displayed on a user interface comprising a set of shortcuts for a set of applications, wherein the icon indicates that the selected application has been designated to automatically start when the media player appliance is starting up and wherein the icon is positioned over at least a portion of a first shortcut for the selected application; and
responsive to the media player appliance starting up and the first user being logged in, automatically start the selected application designated in the configuration file.

2. The media player appliance of claim 1, wherein the remote control device includes a first button for starting an application and a second button for generating a selection interface through which a user designates the selected application to automatically start.

3. The media player appliance of claim 1, wherein the controller is further configured to:

determine whether a second application is already designated in the configuration file; and responsive to the second application being already designated in the configuration file, prevent the configuration file from being updated to designate the selected application for automatic start.

4. The media player appliance of claim 3, further comprising a video output configured to connect to a display unit, wherein the controller is further configured to cause a warning to be displayed indicating that the configuration file has not been updated responsive to the second application being already designated in the configuration file.

5. The media player appliance of claim 1, wherein the controller is further configured to:

receive an indication from a remote control device that the selected application is not designated to automatically start when the media player appliance is starting up; and update the configuration file to remove the selected application from the configuration file.

6. The media player appliance of claim 1, further comprising a communications interface configured to:

connect to an application provider; and provide access to the application provider for the controller, wherein the selected application is located on the application provider.

7. The media player appliance of claim 6, wherein the communications interface is further configured to connect to a network, and wherein the application provider is connected to the network.

8. The media player appliance of claim 1, wherein the configuration file corresponds to a user account information.

9. The media player appliance of claim 8, wherein the controller is further configured to receive the user account information from a remote location.

10. The media player appliance of claim 1, wherein the controller is further configured to:

receive an indication that the selected application is assigned to an assigned button on the remote control device;

receive an indication from the remote control device that the assigned button has been activated; and responsive to receiving the indication that the assigned button has been activated, start the selected application.

11. The media player appliance of claim 1, wherein the remote control device comprises a limited-input control device comprising:

a power button configured to indicate to the media player appliance to start up or shut down; and one or more media buttons separate from the power button and configured to indicate to the media player appliance how to play a media.

12. The media player appliance of claim 1, wherein the media player appliance comprises a streaming media player configured to:

stream media from an external source, and display the streamed media on a display unit.

13. The media player appliance of claim 1, wherein the configuration file comprises a startup file that is automatically loaded during a startup of the media player appliance.

14. A method for automatically starting an application in a media player appliance, the method comprising:

receiving an indication from a remote control device that designates a selected application to automatically start when the media player appliance is starting up;

updating a configuration file of a plurality of configuration files to designate the selected application for automatic start, wherein the configuration file is associated with a first user of a plurality of users of the media player appliance and wherein each configuration file of the plurality of configuration files is associated with a user of the plurality of users;

causing an icon to be displayed on a user interface comprising a set of shortcuts for a set of applications, wherein the icon indicates that the selected application has been designated to automatically start when the media player appliance is starting up and wherein the icon is positioned over at least a portion of a first shortcut for the selected application; and responsive to the media player appliance starting up and the first user being logged in, automatically starting the selected application designated in the configuration file.

15. The method of claim 14, further comprising:

determining whether a second application is already designated in the configuration file; and responsive to the second application being already designated in the configuration file, preventing the configuration file from being updated to designate the selected application for automatic start.

16. The method of claim 15, further comprising causing a warning to be displayed indicating that the configuration file has not been updated responsive to the second application being already designated in the configuration file using a video output configured to connect to a display unit.

17. The method of claim 14, further comprising:

receiving an indication from a remote control device that the selected application is not designated to automatically start when the media player appliance is starting up; and updating the configuration file to remove the selected application from the configuration file.

18. The method of claim 14, further comprising accessing an application provider using a communications interface in the media player appliance, wherein the selected application is located on the application provider.

19. The method of claim 18, further comprising connecting to a network using the communications interface, wherein the application provider is connected to the network.

20. The method of claim 14, wherein the configuration file corresponds to a user account information.

21. The method of claim 20, further comprising receiving the user account information from a remote location.

22. The method of claim 14, further comprising:

receiving an indication that the selected application is assigned to an assigned button on the remote control device;

receiving an indication from the remote control device that the assigned button has been activated; and responsive to receiving the indication that the assigned button has been activated, starting the selected application.

23. The method of claim 14, wherein the media player appliance comprises a streaming media player configured to stream media from an external source and to display the streamed media on a display unit.

24. A non-transitory machine-readable medium comprising instructions which, when executed by a processor, cause a media player appliance to automatically start an application by at least:

receiving an indication from a remote control device that designates a selected application to automatically start when the media player appliance is starting up;

updating a configuration file of a plurality of configuration files to designate the selected application for automatic start, wherein the configuration file is associated with a first user of a plurality of users of the media player appliance and wherein each configuration file of the plurality of configuration files is associated with a user of the plurality of users;

causing an icon to be displayed on a user interface comprising a set of shortcuts for a set of applications, wherein the icon indicates that the selected application has been designated to automatically start when the media player appliance is starting up and wherein the icon is positioned over at least a portion of a first shortcut for the selected application; and responsive to the media player appliance starting up and the first user being logged in, automatically starting the selected application designated in the configuration file.

25. The non-transitory machine-readable medium of claim 24, wherein the configuration file corresponds to a user account information.

26. The non-transitory machine-readable medium of claim 24, wherein the instructions further cause the media player appliance to automatically start the application by at least:

receiving an indication that the selected application is assigned to an assigned button on the remote control device;

receiving an indication from the remote control device that the assigned button has been activated; and responsive to receiving the indication that the assigned button has been activated, starting the selected application.

\* \* \* \* \*